US011854368B2

(12) United States Patent
Grinshtain

(10) Patent No.: US 11,854,368 B2
(45) Date of Patent: Dec. 26, 2023

(54) REFRIGERATED CARGO MONITORING

(71) Applicant: ARROWSPOT SYSTEMS LTD., Kfar Hess (IL)

(72) Inventor: Ran Menachem Grinshtain, Kfar Hess (IL)

(73) Assignee: ARROWSPOT SYSTEMS LTD., Kfar Hess (IL)

( * ) Notice: Subject to any disclaimer, the term of this patent is extended or adjusted under 35 U.S.C. 154(b) by 148 days.

(21) Appl. No.: 17/424,414

(22) PCT Filed: Jan. 23, 2020

(86) PCT No.: PCT/IL2020/050091
§ 371 (c)(1),
(2) Date: Jul. 20, 2021

(87) PCT Pub. No.: WO2020/152684
PCT Pub. Date: Jul. 30, 2020

(65) Prior Publication Data
US 2022/0092962 A1 Mar. 24, 2022

Related U.S. Application Data

(60) Provisional application No. 62/795,655, filed on Jan. 23, 2019.

(51) Int. Cl.
| G08B 21/18 | (2006.01) |
| F25D 11/00 | (2006.01) |
| F25D 29/00 | (2006.01) |
| G06F 18/214 | (2023.01) |

(52) U.S. Cl.
CPC .......... *G08B 21/182* (2013.01); *F25D 11/003* (2013.01); *F25D 29/003* (2013.01); *G06F 18/214* (2023.01); *G06F 2218/12* (2023.01)

(58) Field of Classification Search
CPC ... G08B 21/182; F25D 11/003; F25D 29/003; G06F 18/214; G06F 2218/12
See application file for complete search history.

(56) References Cited

U.S. PATENT DOCUMENTS

2008/0270076 A1* 10/2008 Breed .................... G06F 3/0233
702/185
2014/0067313 A1   3/2014 Breed
2016/0238406 A1   8/2016 Burtner et al.
2017/0184333 A1*  6/2017 Lukasse ................. B60H 1/321
(Continued)

FOREIGN PATENT DOCUMENTS

CN         1487247 A      4/2004
CN       105117770 A     12/2015
(Continued)

*Primary Examiner* — Hongmin Fan
(74) *Attorney, Agent, or Firm* — NKL Law; Jae Youn Kim

(57) ABSTRACT

Methods and systems are provided for monitoring a refrigerated cargo container in real time including receiving sensor signals from a plurality of sensors that include one or more of a temperature sensor, a humidity sensor, and a pressure sensor; and processing the sensor signals to identify one or more signal characteristics that correspond to predefined patterns, wherein the predefined patterns are correlated to one or more container conditions including at least one of an open door, a container load level, and a cargo type.

14 Claims, 11 Drawing Sheets

(56) References Cited

U.S. PATENT DOCUMENTS

| | | |
|---|---|---|
| 2017/0299248 A1* | 10/2017 | High .................... F25D 29/003 |
| 2017/0345245 A1 | 11/2017 | Torresani et al. |
| 2018/0224150 A1 | 8/2018 | Lewis et al. |
| 2018/0260752 A1* | 9/2018 | Verma .................. G06Q 10/083 |
| 2020/0173719 A1* | 6/2020 | Jaakkola ............ G01N 33/0063 |

FOREIGN PATENT DOCUMENTS

| | | |
|---|---|---|
| WO | 2007-137382 A2 | 12/2007 |
| WO | 2018037541 A1 | 3/2018 |

* cited by examiner

REFRIGERATED CARGO MONITORING

CROSS REFERENCE TO RELATED APPLICATIONS

This application is a national phase entry of International Patent Application No. IL2020/050091, titled, "REFRIGERATED CARGO MONITORING," filed Jan. 23, 2020, which claims the benefit under 35 U.S.C. § 119(b) to U.S. Provisional Application Ser. No. 62/795,655, filed Jan. 23, 2019, the entire contents of which are hereby incorporated by reference.

FIELD OF THE INVENTION

The invention generally relates to refrigeration systems and in particular to monitoring refrigeration of cargo during transport.

BACKGROUND

Refrigerated cargo is shipped around the world by a variety of refrigerated enclosures. Hereinbelow, the term "refrigerated container" (or "refrigerated cargo container") refers to any enclosure for transporting refrigerated cargo, such as standard-sized, intermodal containers, truck compartments, air freight boxes, and the like. The term refrigeration unit refers to the elements performing the refrigeration function inside such a refrigerated container, including the refrigeration compressor, valves and pipes.

Increasingly, cargo shipments, whether refrigerated or not, are tracked while in transit, through the transmission of identifying data and GPS location information. Some conditions may be measured by standard sensors of a refrigerated container, such as temperature and humidity sensors which are built in to the "refrigeration unit" of such containers. Other conditions may require custom installation of non-standard sensors into the refrigeration container. Addressing this shortcoming of typical refrigerated containers could benefit multiple parties involved in the transport of cargo.

SUMMARY

Embodiments of the present invention provide apparatus, methods and systems for monitoring refrigerated containers and, in particular, for monitoring container conditions by acquiring data signals from refrigeration controllers and processing those signals to predict container conditions not being directly measured, such as cargo load level (ullage), cargo type, and potential problems, such as an open door. Some conditions not being directly measured may be measured by sensors, but such sensors are not typically installed on refrigerated containers, such as a door sensor. Alerting a driver or a ship's crew to problematic container conditions can allow a problem to be corrected before it leads to damage. Early indications of such conditions can also be valuable to other stakeholders in the transportation process.

There is therefore provided by embodiments of the present invention a method of monitoring a refrigerated cargo container in real time, implemented by a controller having one or more processors and having memory storage, the memory storage including instructions that when executed by the one or more processors implement steps of receiving sensor signals from a plurality of sensors that include one or more of a temperature sensor, a humidity sensor, and a pressure sensor; and processing the sensor signals to identify one or more signal characteristics that correspond to predefined patterns, wherein the predefined patterns are correlated to one or more container conditions including at least one of an open door, a container load level, and a cargo type.

In some embodiments the steps further include providing a status notification indicative of the one or more container conditions. The status notification may be provided at regular time intervals or as an alert provided when one of the container conditions is not within a predefined proper range.

The sensor signals may include signals indicating a refrigeration return air temperature, and the predefined patterns may include patterns of a return air temperature signal that are correlated to the one or more container conditions. The sensor signals may include signals indicating a refrigeration supply air temperature, and the predefined patterns may include patterns of a supply air temperature signal that are correlated to the one or more container conditions. The sensor signals may include signals indicating an ambient air temperature outside the container, and the predefined patterns may include patterns of an ambient air temperature signal that are correlated to the one or more container conditions.

The sensor signals may include signals indicating a refrigeration unit suction pressure, and the predefined patterns include patterns of a refrigeration unit suction pressure signal that are correlated to the one or more container conditions. The sensor signals may include signals indicating a refrigeration unit discharge pressure, and the predefined patterns include patterns of a refrigeration unit discharge pressure signal that are correlated to the one or more container conditions.

In some embodiments, receiving the sensor signals may include receiving the sensor data from the same refrigerator unit that provided data to generate the predefined patterns. The sensor signals may include data from one or more of temperature and pressure sensors at evaporator, condenser, and compressor points of the refrigeration gas cycle.

The method may further include determining the predefined patterns from training sensor signals, from multiple refrigeration controllers on multiple respective refrigerated containers, during training mode operation of operation when open and closed door conditions are known, identifying patterns in the training sensor signals, and correlating the identified patterns with the open and closed door conditions. The training sensor signals further include concurrent door sensor signals from multiple respective door sensors installed on the multiple respective refrigerated containers, and the open and closed door conditions may be determined by the door sensor signals.

The method may further include determining the predefined patterns by receiving training sensor signals, from multiple refrigeration controllers on multiple respective refrigerated containers, during training mode operation of operation when cargo load level conditions are known, identifying patterns in the training sensor signals, and correlating the identified patterns with the cargo load level conditions. The cargo load level conditions may be determined by cargo load level sensors installed in the multiple respective refrigerated containers.

Additionally or alternatively, the method may include correlating the identified patterns with cargo types during training mode operation of operation.

Receiving the sensor signals from the plurality of sensors may include receiving the sensor signals by an auxiliary processor of the refrigerated cargo container, from a refrigeration controller of the refrigerated cargo container.

Correlation of the predefined patterns to the container condition of the container load level may be a correlation to a binary alternative of a container empty or a container full. Additionally or alternatively, the correlation may be to a percent of utilized container capacity.

In further embodiments, a system is provided for monitoring a refrigerated cargo container in real time, the system including a plurality of sensors, such as a temperature sensor, a humidity sensor, and a pressure sensor; and a controller, which may include one or more processors and memory storage, the memory storage including instructions executed by the one or more processors to implement steps of monitoring. The steps may include: receiving sensor signals from the plurality of sensors; and processing the sensor signals to identify one or more container conditions, including at least one of an open door, a container load level, and a cargo type, wherein processing the sensor signals comprises identifying signal characteristics that correspond to predefined patterns, and wherein the predefined patterns are correlated to at least one of the one or more container conditions.

BRIEF DESCRIPTION OF DRAWINGS

For a better understanding of various embodiments of the invention and to show how the same may be carried into effect, reference will now be made, by way of example, to the accompanying drawings. Structural details of the invention are shown to provide a fundamental understanding of the invention, the description, taken with the drawings, making apparent to those skilled in the art how the several forms of the invention may be embodied in practice. In the accompanying drawings.

DETAILED DESCRIPTION

Figure 1:
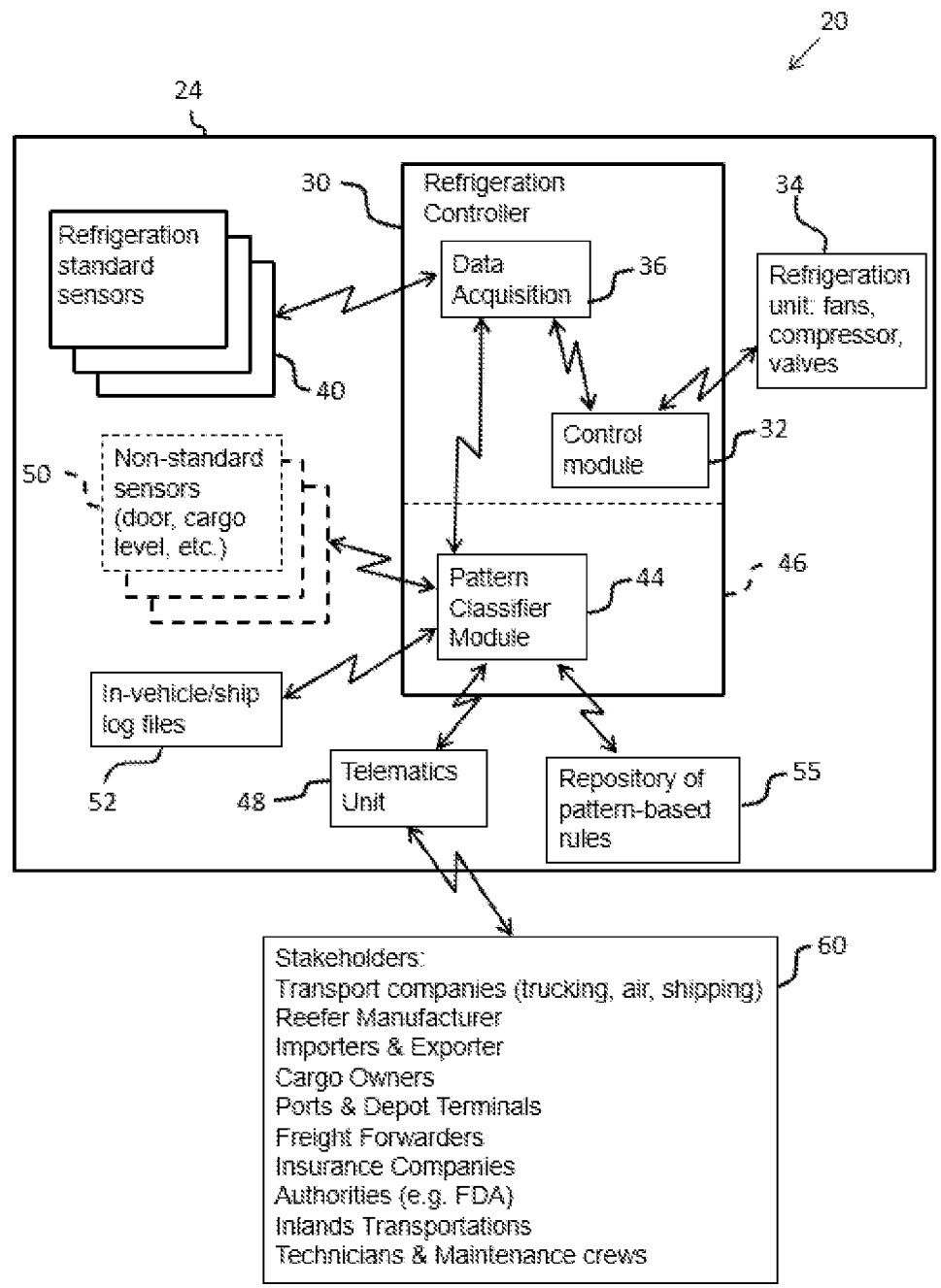
FIG. 1 is a schematic block diagram of a system for monitoring a refrigerated container, according to some embodiments of the present invention.

It is to be understood that the invention and its application are not limited to the methods and systems described below or to the arrangement of the components set forth or illustrated in the drawings, but are applicable to other embodiments that may be practiced or carried out in various ways.

Embodiments of the present invention provide methods and systems for monitoring a refrigerated container. Some types of applicable refrigeration units are listed in the appendix herein.

FIG. 1 is a schematic block diagram of a system 20 for monitoring a refrigerated container 24, according to some embodiments of the present invention. The refrigerated container 24 includes a refrigeration controller 30. The refrigeration controller 30 includes a control module 32, which controls the operation of devices of a refrigeration unit 34, such as compressors, fans, and valves. The control module controls the refrigeration unit 34 based on preset settings, such as preset target temperature ranges, and based on input signals received by a data acquisition module 36 from multiple standard refrigerator sensors 40 (hereinbelow "standard sensors"). Standard sensors 40 are sensors that are frequently installed in refrigerated containers to provide input signals for controlling refrigeration units. They include sensors to measure the cargo container air temperature (such as supply and return air temperatures), as well as temperatures and pressures of the refrigeration gas at different points in the refrigeration cycle (such as evaporator, condenser, and compressor points). Pressure readings (i.e., signals) may be received from a suction pressure sensor (before the compressor) and a discharge pressure sensor (at the compressor output) of the refrigeration unit. Standard sensor signals may also include humidity readings from one or more humidity sensors. Additional standard sensors are listed in the appendix hereinbelow. Most standard sensors provide signals continuously or at regular intervals, which may range from seconds to minutes. Signals from standard sensors may be analog signals, which may be converted to digital signals by the data acquisition module 36.

In embodiments of the present invention, the refrigeration controller 30 also includes a pattern classifier module 44 for identifying patterns correlated with non-sensor conditions, as described further hereinbelow. The pattern classifier module 44 is typically configured to acquire and to process data from input drivers of the refrigeration controller, such as the data acquisition module 36. In further embodiments, the pattern classifier module 44 may be executed by an auxiliary processor 46, which may be installed in the container in addition to the standard refrigeration controller (the auxiliary processor being indicated by a dotted line as optionally distinct from the refrigeration controller). Installing an auxiliary processor overcomes the need to modify a standard refrigeration controller, which may be a proprietary, closed system. When executed by an auxiliary processor, the pattern classifier may receive signal data provided by the refrigeration controller by wireless or wired methods known in the art, such as Bluetooth or RS-232 connections. In some embodiments, the auxiliary processor also serves as a telematics processor 48, which also provides telematics functions such as sending wireless communications over satellite and/or GSM connections, as described further hereinbelow.

The pattern classifier module 44 may operate in either of two modes, a training mode and an operational mode, the two modes typically implemented by respective training and operational software and/or hardware-based programs (which may be implemented, as described above, on an auxiliary processor). An initial training mode may be performed prior to the start of an operational mode. During the training mode, the pattern classifier module 44 receives standard sensor signals from the data acquisition module 36 of the refrigeration controller 30. Hereinbelow, the "standard sensor signals" that are received in training mode are also referred to as "training sensor signals."

The pattern classifier module 44 may also receive signals from "non-standard" sensors 50 that are not typically installed with the refrigeration unit. These non-standard sensors 50 may be installed specifically for the training mode, and may include a door sensor, which senses when a door of the refrigerated container is open or closed, and a cargo load level sensor, such as an optical or ultrasound level sensor, which senses how full a container is. Alternatively or additionally, non-standard signals may be input to the pattern classifier module 44 by human operators who may record container conditions—such as an open door, a cargo load level, as well as a type of cargo—in an accessible memory storage, such as a log file 52, or other manual entry method.

After acquiring the standard and non-standard signals during the training mode, the pattern classifier module 44 classifies the standard signals according to container conditions indicated by the non-standard sensors 50 and/or by manual entry. In particular, patterns in the standard sensor signals that are acquired during training mode operation are classified according to several container conditions: an open door condition (whether or not the door is open); a container load level (in percent, where zero indicates an empty container and 100% indicates a full container); and a cargo type (such as frozen food, liquids, or insulated boxes). The load level and the type of cargo may also be input manually at the start of a transport voyage, for example, when recording a loading manifest.

During training mode operation, the pattern classifier module 44 identifies patterns of recurring characteristics (or "features") of the standard sensor signals, such as patterns related to data values (measured in appropriate metrics, such as degrees or psi), ranges, rates of change, frequency of repeating patterns, and variability. These patterns (which may also be called "signatures") are correlated with the container conditions described above to generate a rules repository 55 of pattern-based rules.

The rules repository includes correlations between standard sensor patterns and the container conditions existing concurrently with those patterns during training. Pattern-based rules specify "predefined patterns" of standard sensor signals that are predictive of the container conditions that were measured concurrently during training, that is, the status of the container door, of the cargo level, and of the cargo type.

The repository may be generated in real-time during training by the pattern classifier module 44 or by an external computing system to which the pattern classifier module 44 transmits the sensor data. Alternatively, the data acquired by the pattern classifier module 44 may be stored in the memory storage associated with the log file 52 and may be processed by a training algorithm subsequent to the period of cargo shipping (e.g., by an external computing system). The log file 52 may be in memory storage of the refrigeration controller 30 or of the telematics unit 48 or other accessible memory available in the refrigerated container 24.

Sensor signals may vary because of the differences between containers with respect to hardware age and wear, which affects elements such as the shell of the container and the refrigeration unit. In some embodiments, the sensor signals acquired for training, as described below, may be acquired and processed for each individual container, to generate container-specific rules repositories. Alternatively, signals from many containers may be statistically merged, for example by a pattern recognition (e.g., machine learning) algorithm, to generate a rules repository that is sufficiently general to identify patterns in data from multiple containers.

Standard sensor signals that may be correlated to the container conditions include refrigeration unit suction pressures, discharge pressures, gas temperatures, and compressor on/off status, container power on/off status, supply, return, and ambient temperatures, and internal humidity. In addition, additional data provided by the refrigerator controller, such as air temperature set points and humidity set points, may be correlated with the container conditions. Additional sensor signals, noted in the appendix, may also be used to increase the prediction accuracy. In some embodiments, signal patterns that indicate container conditions may include patterns from multiple sensors, for example, from a combination of temperature, pressure, and humidity sensors.

The rules repository is subsequently applied during the operational mode (when non-standard sensors are not installed in a container), to predict the container conditions of door status, cargo level, and cargo type. Correlating container conditions during training with patterns from multiple sensor signals increases the accuracy of the subsequent prediction of container conditions during the operational mode.

In some embodiments, a refrigerated container is operated in "operating mode" after training data is processed from the same container. Alternatively, a multiple refrigerated containers are operated in the training mode, and the results are merged and then applied to other containers for the operating mode.

In operating mode, the pattern classifier module 44 acquires real-time data from the refrigeration standard sensors and extracts patterns from the sensor signals corresponding to patterns determined during training and which are defined in the repository 55. The rules defined in the repository are defined before the operating mode begins, i.e., they are "predefined". In particular, in embodiments of the present invention, these predefined patterns correspond to one or more of 1) whether a door of the container is open, 2) the level of the cargo, and 3) the type of cargo. The process of acquiring sensor signals and of identifying patterns may continue throughout a shipment of freight, from on-loading to off-loading of cargo. The process may also continue indefinitely, thereby including tracking of a refrigerated container between cargo assignments. In addition, the operating mode may also be configured to improve the patterns determined during the training mode, that is, when container conditions are determined to be known with certainty during the operating mode, the concurrently acquired sensor signals may be processed to improve the predefined patterns specified in the rules repository.

While in operating mode, the pattern classifier module 44 may transmit predicted container conditions in real time, as well as additional data regarding container status, to electronic addresses (e.g., email or other forms of electronic messaging) of multiple parties, or "stakeholders" 60 who have a stake in the success of the transport. These stakeholders may include:

Transport Companies (trucking, air freight, and/or shipping companies)
Container Manufacturers
Importers & Exporters
Cargo Owners
Port & Depot Terminal Operators
Freight Forwarders
Insurance Companies
Government Authorities (e.g., FDA)
Inland Transportation Companies
Technicians & Maintenance Crews Different stakeholders may have a variety of reasons for tracking the container conditions described above while freight is in transit. For example, tracking the opening of a door can prevent spoilage of cargo and can assist in assessing carrier responsibility for spoilage. If an open door is identified early during a shipment, for example when the internal versus external temperature difference is not great, the door may be shut before goods have perished.

Tracking whether or not a container is loaded, as well as the load percent, may be important for reasons including identifying theft and for determining whether container power is needed. Tracking cargo type may also be important for identifying theft and smuggling. Tracking by identifying patterns in standard sensor signals circumvents the need to incur installation and maintenance costs associated with non-standard sensors, and reduces the need for human surveillance of container conditions.

Transmissions may be sent to stakeholders 60 by available transmission technologies, such as the telematics unit 48. The telematics unit 48 may be configured to employ satellite communications, while freight is at sea, and GSM communications during land transport. In some embodiments, the telematics unit 48 may also serve as the auxiliary processor described above, such that the pattern classifier module 44 is executed by the telematics unit rather than by the refrigeration controller 30.

If means of communications are not available for real time communications, status data (i.e., predicted container conditions), as w2ell as raw data (sensor signal data) may be stored in the log files 52 associated with the pattern classifier module 44. The log files can also be stored in the telematics device 48.

Refrigerated containers may include the following commercial products. (All products noted below are trademarks of the indicated companies.)
   Carrier Transicold: EliteLINE, ThinLINE, PrimeLINE, NaturaLlNE, PrimeLINE ONE
   THERMO KING: Magnum
   DAIKIN: LXE, ZESTIA
   MAERSK CONTAINER INDUSTRY-STAR COOL: STAR COOL
   KLINGE TEMPERATURE CONTROL: Military Air Conditioning Unit, Military Refrigerated A-Frame Container, Multi-Temperature & Single Temperature Zone Military Refrigerated Containers, Blast Freezer Container, Deep Freezer Container, Explosion-Proof Refrigerated Container, Dual Refrigerated & Integral Generated Set.

Light commercial vehicles (LCV), including trucks, vans and other vehicles may include fixed refrigerated containers, and may include the following commercial products. (All products noted below are trademarks of the indicated companies.)
   Carrier Transicold: Neos, Pulsor, Vanta, Viento, Xarios, Zephyr, Iceland, Supra, Syberia
   THERMO KING: B-100, V-220, V-320, V-520, V-800, T-580, T-680, T-880, T-1080, T-1280
   TKT: TKT-20, TKT-40, TKT-50, TKT-60, TKT-200, TKT-300, TKT-400, TKT-600, TKT-800, TKT-900, TKT-1000, TKT-1200
   HWA SUNG: HWA SUNG series
   GUCHEN THERMO: TR, TRF, C Truck trailers with refrigerated compartments for transport of perishable goods may include the following commercial products. (All products noted below are trademarks of the indicated companies.)
   Carrier Transicold: Vector
   THERMO KING: PRECEDENT S-600, PRECEDENT S-700, PRECEDENT C-600, PRECEDENT S-610M, PRECEDENT C-610M, PRECEDENT S-610DE, Heat King Packages or boxes for cargo/goods that contain an active refrigerator cooling or heating system may include the following commercial products. (All products noted below are trademarks of the indicated companies.)
   ENVITOTAINER: RAP, RKN
   KOREAN AIR: All refrigeration series
   PHARMA PORT: All refrigeration series
   SAFE: All refrigeration series
   AIR CARGO: All refrigeration series FIGS. 2-11 are graphs of refrigerator sensor signals, acquired during monitoring of a refrigerated container during transport, according to some embodiments of the present invention. The graphs indicate the types of patterns of standard sensor signals that may be correlated with the container conditions that are not measured by standard sensors (i.e., door open/closed status, cargo level, and cargo type). As described above, standard sensor signals are acquired during both training and operational mode. During training, the container conditions may be determined by non-standard sensors or manually by human operators.

Figure 2:
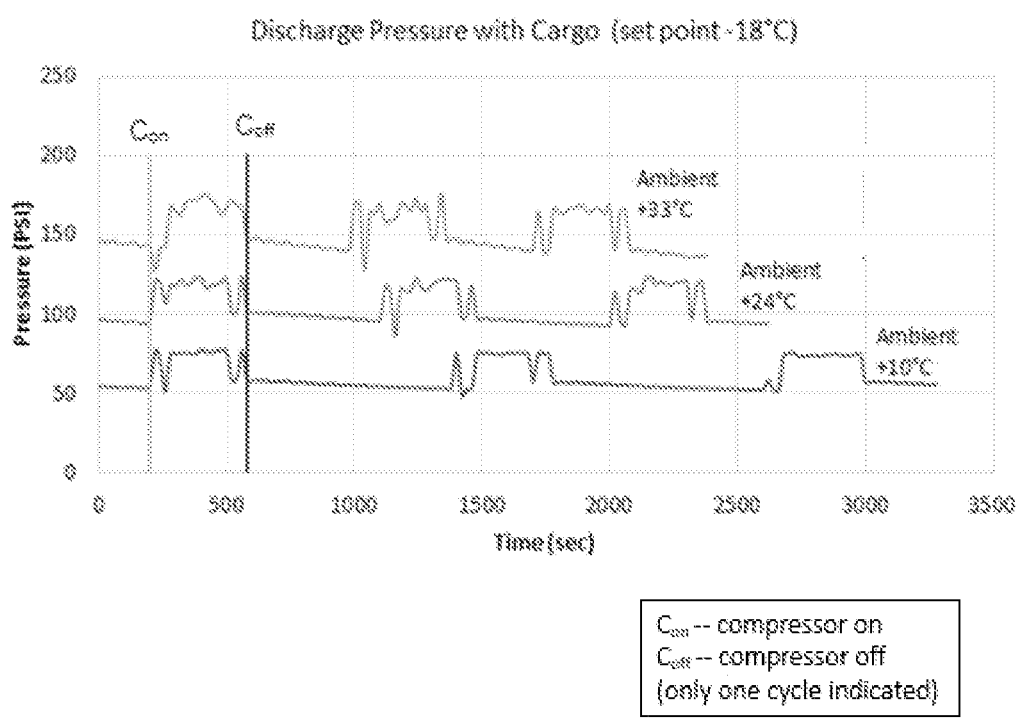
FIGS. 2-11 are graphs of refrigerator sensor signals, acquired during monitoring of a refrigerated container during transport, according to some embodiments of the present invention.

FIG. 2 is a graph of discharge pressure of a refrigeration unit at different ambient temperatures (i.e., temperatures outside the container, measured by a "standard", external temperature sensor connected to the refrigerator controller). The graph shows three discharge pressure signals, each measured at a different ambient temperature condition. The three ambient temperature conditions were, respectively, 10° C., 24° C., and 33° C. Patterns in the discharge pressure signals vary according to the ambient temperature. For example, the level of the pressure is approximately 50 PSI at 33° C.; 100 PSI at 24° C., and 150 PSI at 10° C. The pressures increase when the refrigerator compressor goes on, as indicated by the step-like intervals of the discharge pressure signals. The frequency of these compressor transitions is also influenced by the ambient temperature; the frequency is shown to increase as the temperature decreases. When extracting patterns that correspond to the abovementioned container conditions (door status, cargo load, and cargo type), the effect of ambient temperature is first filtered out of the signals. Measurements shown in FIG. 2 and in the other graphs described hereinbelow were performed when cargo consisted of frozen corn. Measurements based on other types of refrigerated cargo may be performed, as well, to improve accuracy of correlation when other cargo types are transported.

Figure 3A:
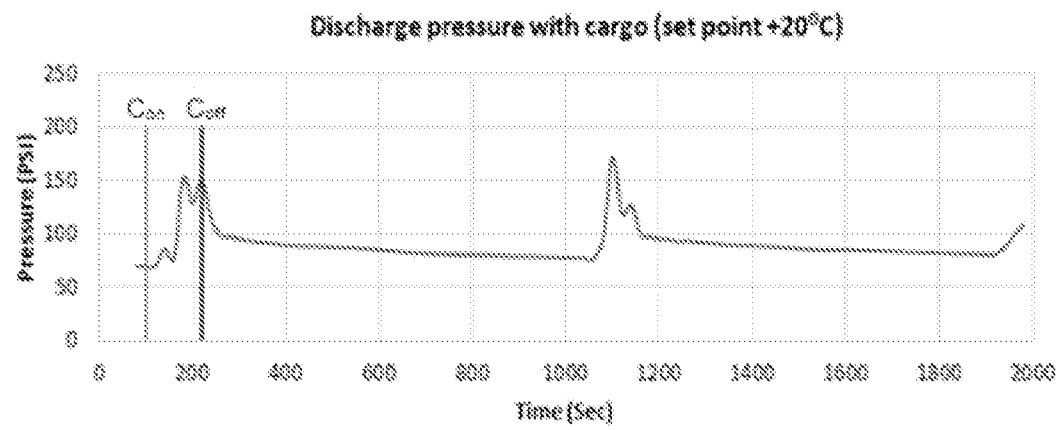
Figure 3B:
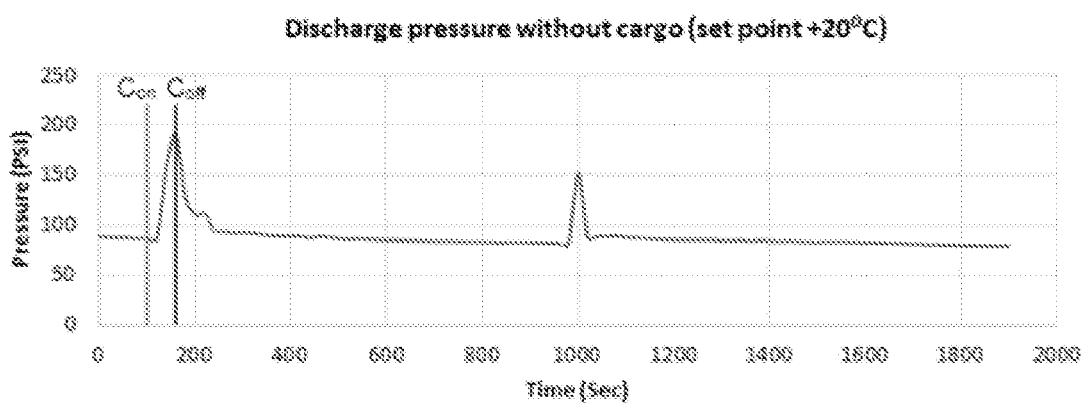

FIGS. 3A and 3B are graphs of discharge pressures of the refrigeration unit, with and without cargo respectively. The signals were acquired as indicated at a temperature set point of 20° C. and at similar ambient temperatures. As shown in the graphs, when there is cargo the compressor works for longer intervals than when there is no cargo, and the pressure rises with a ripple pattern. Also, the pressure rises to about 150 PSI with cargo, as opposed to about 190 PSI without cargo. The compression cycle (from one start to the next start) has a frequency of about 1000 seconds with cargo, and about 900 seconds without cargo. These patterns may be converted into rules for the rules repository, correlating pressure signals with cargo load levels.

Figure 4A:
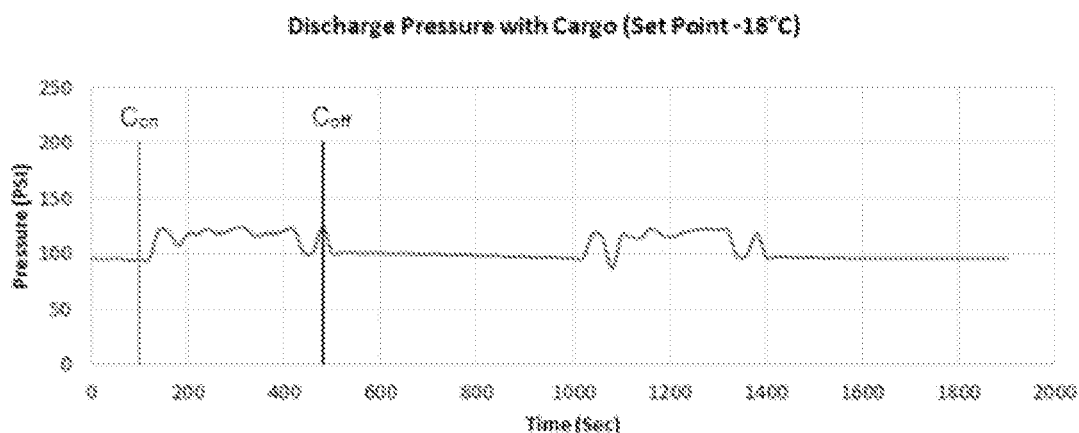
Figure 4B:
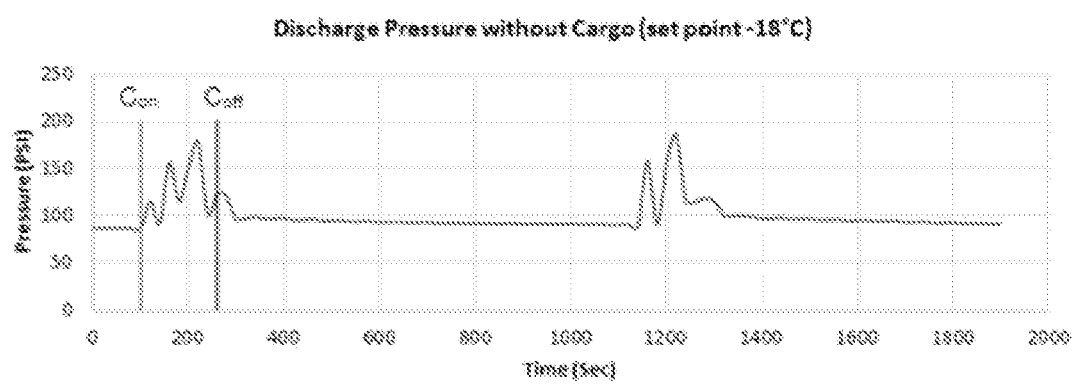

FIGS. 4A and 4B are graphs of discharge pressures of the refrigeration unit, with and without cargo respectively. The discharge pressure signals were acquired as indicated at a temperature set point of −18° C. and at similar ambient temperatures. As shown in the graphs, when there is cargo the compressor works for longer intervals than when there is no cargo, 400 seconds vs. 150 seconds. Also, when there is cargo, the pressure during the compressor operation has a much more pronounced ripple (i.e., greater variability). The pressure with cargo rises to about 130 PSI with cargo, as opposed to about 190 PSI without cargo. The compression cycle (from one start to the next start) has a frequency of about 900 seconds with cargo, and about 1000 seconds without cargo. These patterns may also be converted into rules for the rules repository, correlating pressure signals with cargo load levels.

Figure 5A:
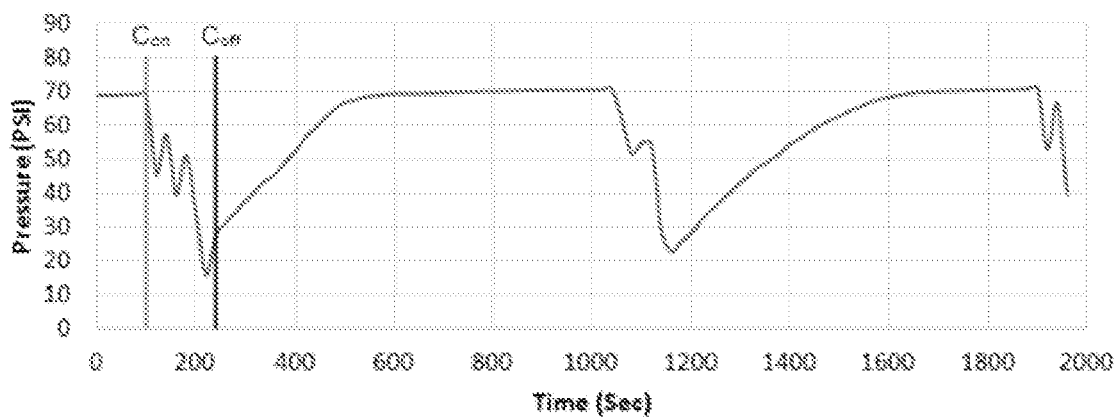
Figure 5B:
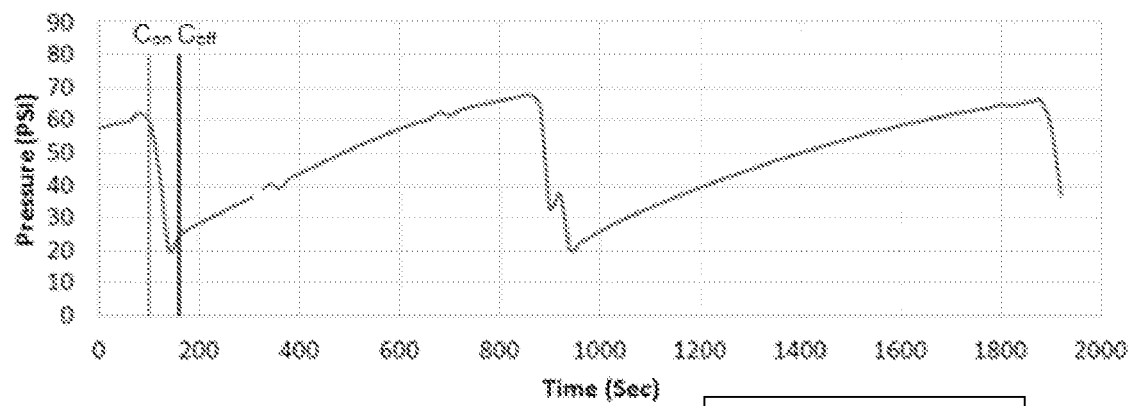

FIGS. 5A and 5B are graphs of suction pressures of the refrigeration unit, with and without cargo respectively. The suction pressure signals were acquired as indicated at a temperature set point of −18° C. and at similar ambient temperatures. As shown, when there is cargo the compressor works for longer intervals than when there is no cargo, and the suction pressure drops with a ripple pattern. Both with and without cargo, the suction pressure drops from about 70 PSI to about 20 PSI with cargo; however, the suction pressure rise when the compressor is not working is much more pronounced when there is cargo than when there is no cargo (rising in about 300 seconds with cargo, as opposed to about 700 seconds without cargo. The suction pressure compression cycle (from first start to second start) has a frequency of about 900 seconds with cargo, and about 700 seconds without cargo. These patterns may also be converted into rules for the rules repository, correlating pressure signals with cargo load levels.

Figure 6A:
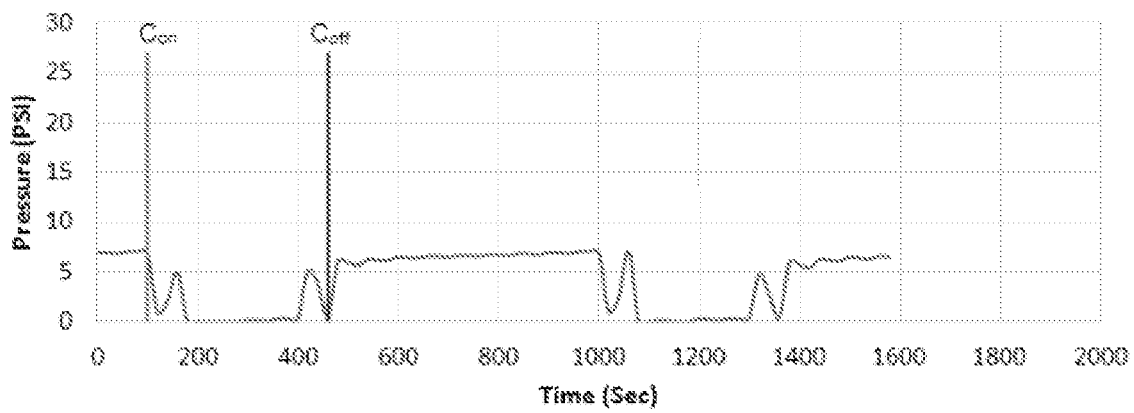
Figure 6B:
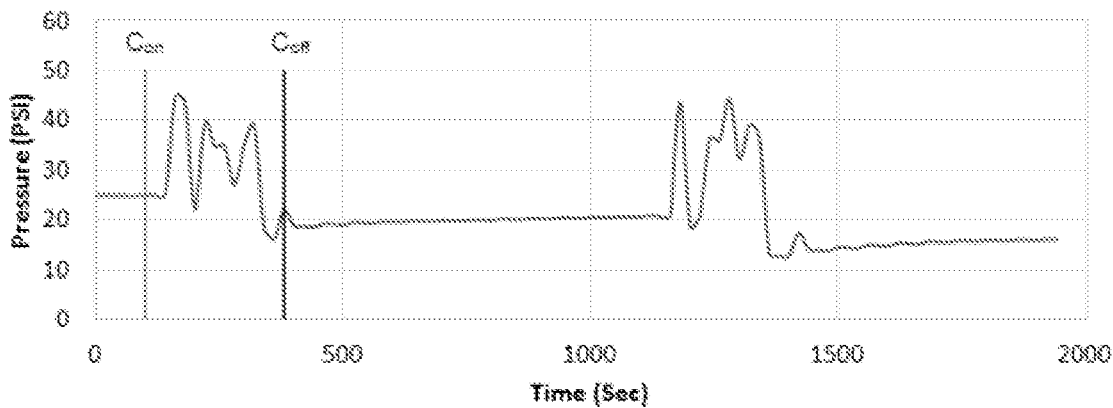

FIGS. 6A and 6B are graphs of suction pressures of the refrigeration unit, with and without cargo respectively. The suction pressure signals were acquired as indicated at a temperature set point of −18° C. and at similar ambient temperatures. As shown, when there is cargo the compressor works for longer intervals than when there is no cargo, and the suction pressure drops with a ripple pattern. Both with and without cargo, the suction pressure drops from about 70 PSI to about 20 PSI with cargo; however, the suction pressure rise when the compressor is not working is much more pronounced when there is cargo than when there is no cargo (rising in about 300 seconds with cargo, as opposed to about 700 seconds without cargo. The suction pressure compression cycle (from one start to the next start) has a frequency of about 900 seconds with cargo, and about 700 seconds without cargo. These patterns may also be converted into rules for the rules repository, correlating pressure signals with cargo load.

Figure 7A:
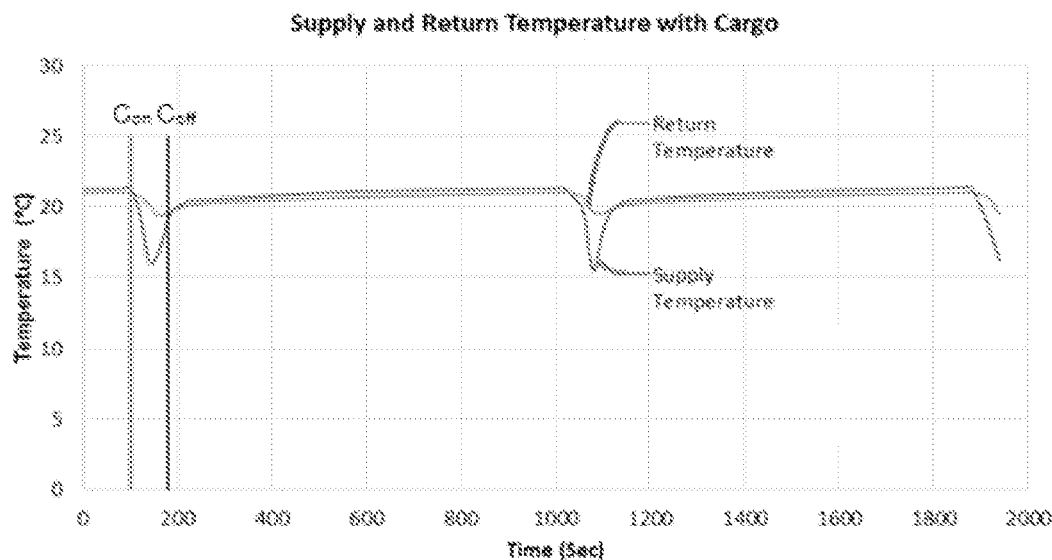
Figure 7B:
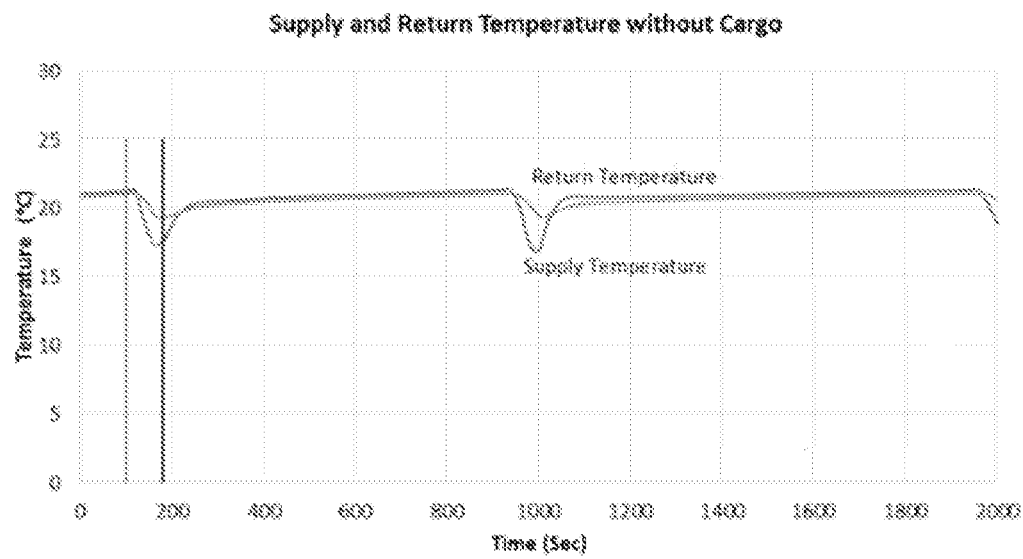

FIGS. 7A and 7B are graphs of supply and return temperatures of the refrigeration unit, with and without cargo respectively. Both with and without cargo, the temperatures range from about 20° C. to about 21° C. when the compressor is not working. With cargo, the supply temperature drops to almost 15° C. when the compressor works, whereas the drop is to only about 17° C. without cargo. The compression cycle (from one start to the next start) has a frequency of about 950 seconds with cargo, and about 800 seconds without cargo. These patterns may also be converted into rules for the rules repository, correlating pressure signals with cargo load.

Figure 8:
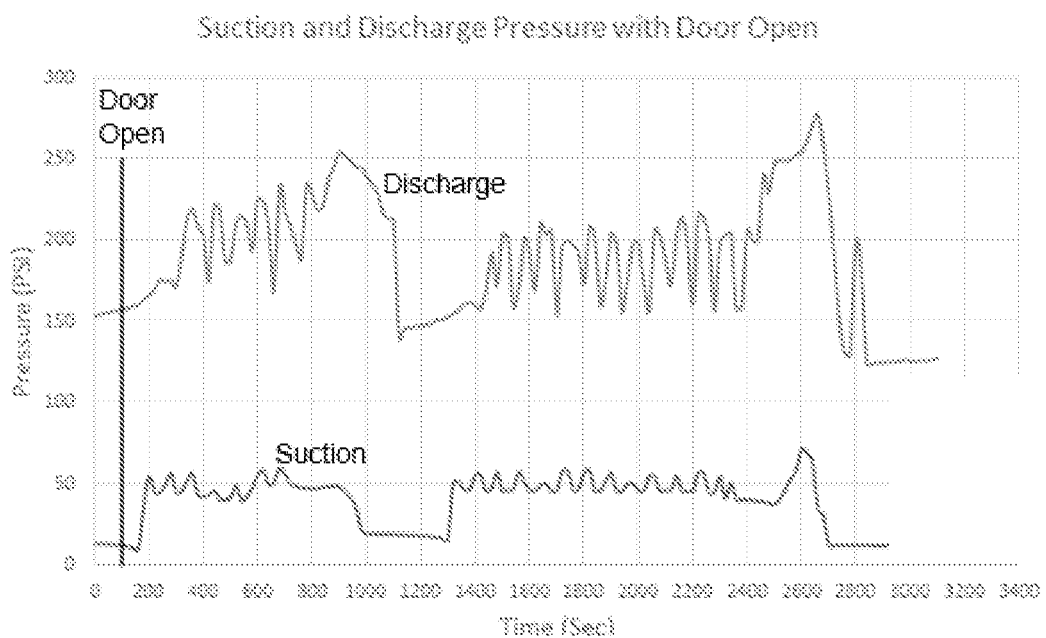

FIG. 8 shows graphs of suction and discharge pressure signals of the refrigeration unit, when a door of the container is opened. Both signals were measured with full loads of cargo. With the door open, the compressor works much longer during each cycle than with the door closed (the door closed condition shown in the graphs of FIGS. 2-7), and the pressure signals show much more ripple. The ripple in the discharge pressure signal shows a peak-to-peak jitter of about 50 PSI, with a frequency of about 50 seconds per jitter cycle. At the peak of compressor operation, the discharge pressure reaches 270 PSI, before falling after the compressor stops working to less than 130 PSI. The compression cycle (from one start to the next start) has a frequency of about 1500 seconds. These signal patterns may also be converted into rules for the rules repository, correlating pressure signals with a status of whether the door is open or closed.

Figure 9:
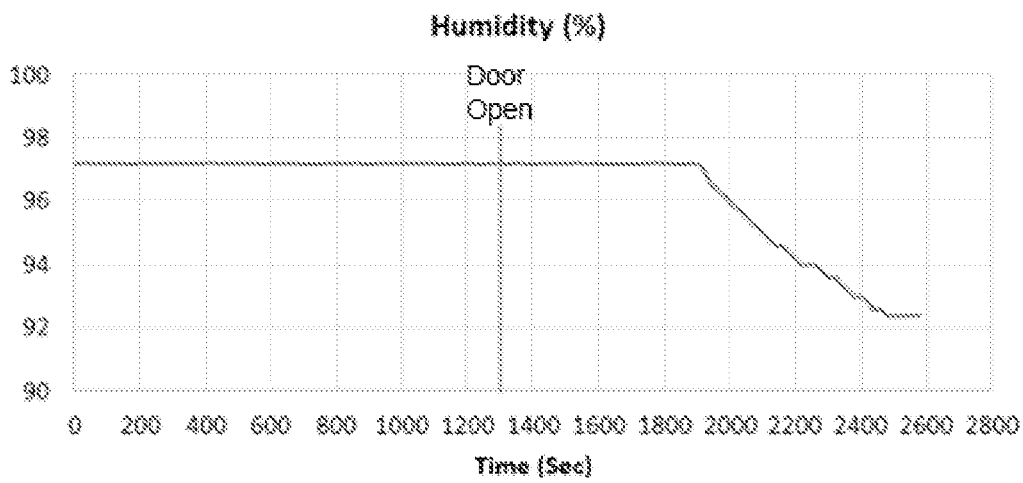

FIG. 9 is a graph of humidity of the refrigeration unit, when a door of the container is opened. The measurement was made when the container power was off, meaning that the compressor could not go on automatically. The measurement was also done with cargo. After the door is opened, the humidity remains constant for about 600 seconds before beginning to drop, from about 97% humidity to about 92% within another 600 seconds. Again, these patterns may be specified as rules for correlating pressure signals with an open door status.

Figure 10A:
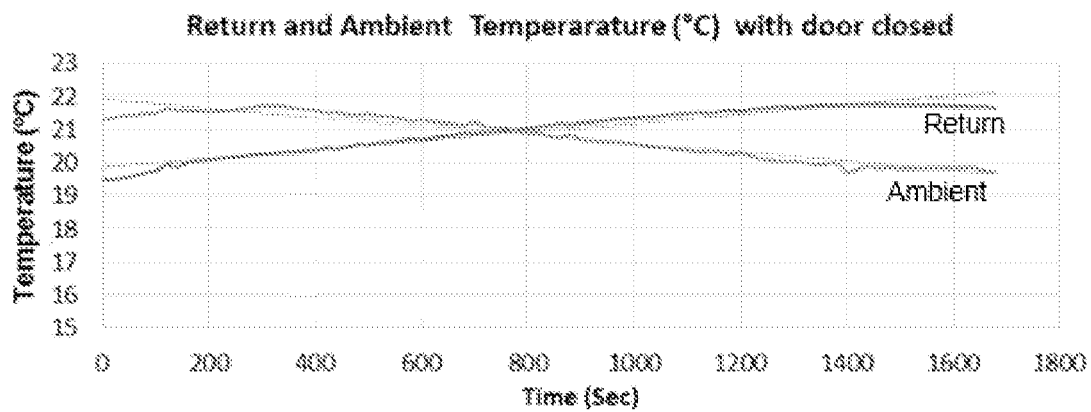
Figure 10B:
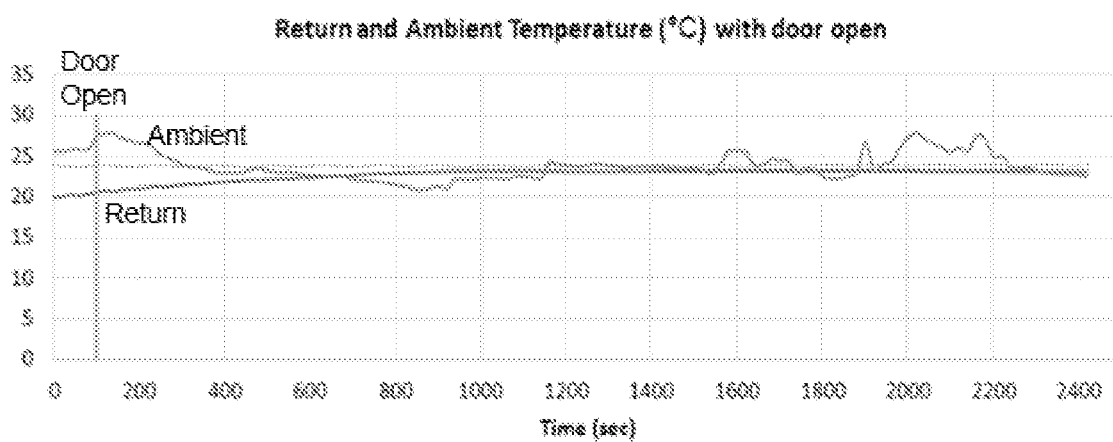

FIGS. 10A and 10B are graphs of return (i.e., internal) and ambient (i.e., external) air temperatures when the container power is off, that is, when the compressor cannot begin operating. In both FIGS. 10A and 10B, the power is turned off at time zero. In FIG. 10B the door is also opened at time 100 seconds (gray line), whereas in FIG. 10A the door remains closed. In both graphs, the return temperature starts at about 20° C. FIG. 10A shows that even though the ambient temperature slowly drops, the temperature inside the container continues to rise to an earlier level of the ambient temperature. Subsequently, the return temperature levels off, and it then begins to fall (not shown in the graph). This delay between the change in external temperature and the change in internal temperature is due to the insulation of the container (given that the door is closed). By contrast, as shown in FIG. 10B, when the door is open the internal temperature quickly changes to match the external temperature, or, more precisely, to match a linear average of the external temperature. That is, the return temperature does not fluctuate as quickly as the ambient temperature and therefore represents an average of a fluctuating ambient temperature. These patterns may also be converted into rules for the rules repository, correlating pressure signals with the status of the door.

Figure 11:
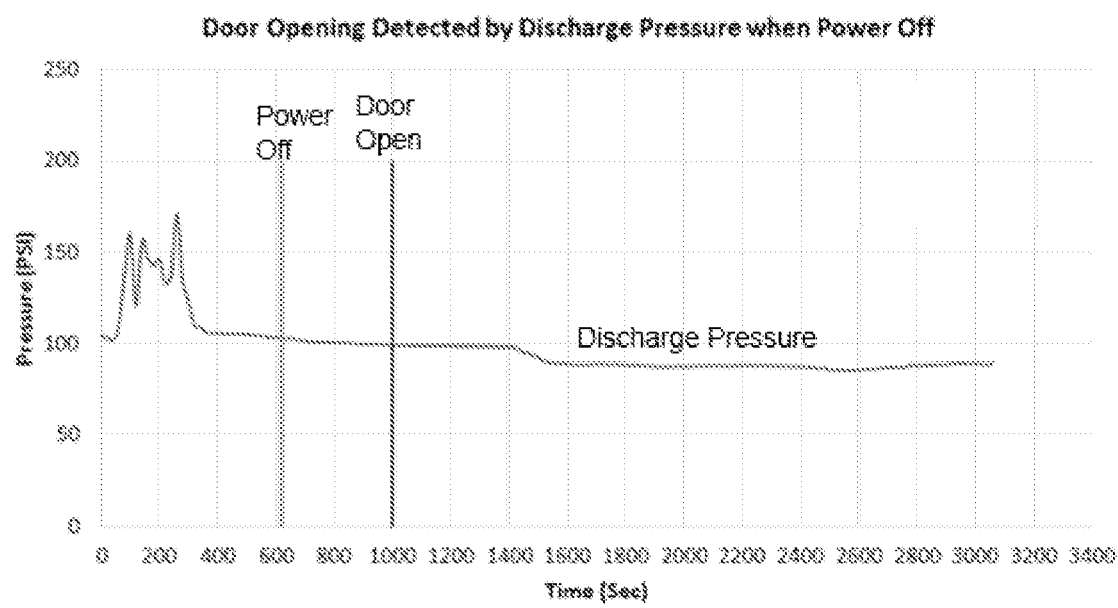

FIG. 11 shows a graph of discharge pressure of the refrigeration unit, when a door of the container is opened and when the power is turned off. The first vertical mark indicates the power being turned off; the second indicates the container door being opened. About 400 seconds after the opening of the door, the discharge pressure drops by about 10 PSI, providing an additional pattern correlating the discharge pressure signal with the opening of the container door.

Figure 12:
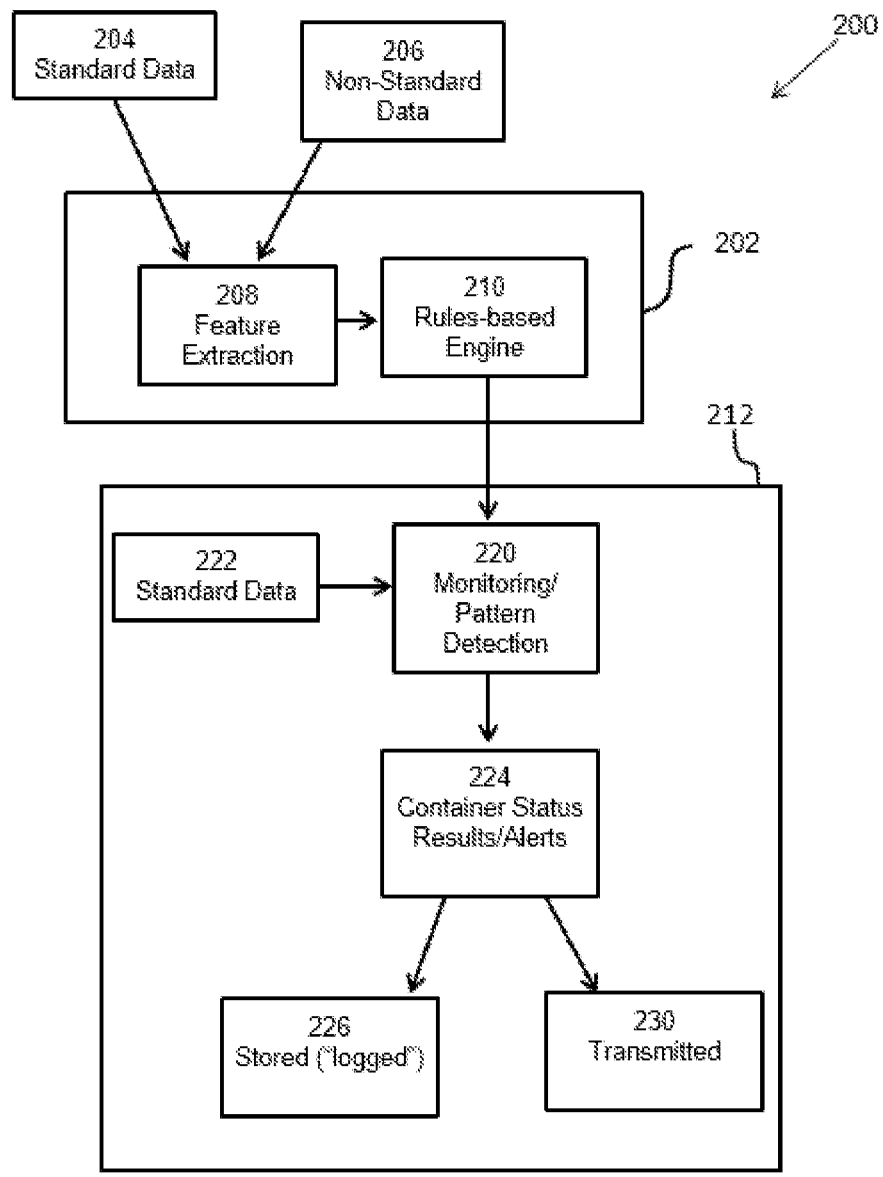
FIG. 12 is a flow diagram of a method for remote monitoring of a refrigerated container, according to some embodiments of the present invention.

FIG. 12 is a flow diagram of a process 200 for remote monitoring of a refrigerated container, according to some embodiments of the present invention. The first stage of the process includes training a pattern recognition system to identify patterns of data from "standard" installed sensors, which are correlated with container conditions that are monitored by non-standard indicators (step 202). These container conditions may include the status of the door (whether open or closed), the level of the cargo (whether there is cargo, and if so, how full the container is), and what type of cargo is loaded (e.g., produce, consumer goods, fuel, etc.). Standard sensor signals that are provided by typical refrigeration controllers are acquired at a step 204. These sensor signals include refrigeration unit pressures, air temperatures, humidity, compressor on/off status, and power on/off, and may also include signals from additional sensors listed in the Appendix. Concurrently, at a step 206, non-standard indicators of the container conditions are also acquired, either input manually by human operators or acquired automatically from "non-standard" sensors. The training stage includes two steps: extraction of patterns in the sensor signals (step 208), and generation of rules for classifying subsequent signals according to the identified patterns (step 210). Rules may also be annotated to indicate that alerts should be issued when certain conditions are detected, such as when the door is determined (i.e., predicted by correlation) to have been opened.

The second stage of remote monitoring is an operational mode 212, which includes applying the rules of the step 210 to detect patterns in standard sensor signals (step 220). The standard sensor signals are acquired during operational mode at a step 222. When certain container conditions are detected, an alert may be issued. Alerts may include a determination that the door is open, or the container is empty, or the cargo type has changed or is suspicious. Such alerts may be transmitted at step 230. In addition, regular status updates, issued at regular intervals (e.g., once every 5 minutes) may be transmitted to parties regarding predicted container conditions. Alerts and status updates may also be logged at step 226, as described above.

Computational aspects of process 200 and of system 20 may be implemented in digital electronic circuitry, or in computer hardware, embedded firmware, software, or in combinations thereof. All or part of the process may be implemented as a computer program product, tangibly embodied in an information carrier, such as a machine-readable storage device or in a propagated signal, for execution by, or to control the operation of, data processing apparatus, such as a programmable processor, computer, or deployed to be executed on multiple computers at one site, or distributed across multiple sites, including cloud configurations. Memory storage may also include multiple distributed memory units, including one or more types of storage media. A computing system configured to implement the system may have one or more processors and one or more network interface modules. Processors may be configured as a multi-processing or distributed processing system. Network interface modules may control the sending and receiving of data packets over networks.

It is to be understood that the scope of the present invention includes variations and modifications thereof which would occur to persons skilled in the art upon reading the foregoing description and which are not disclosed in the prior art.

APPENDIX

Refrigerated Container Controller Data

Controllers of refrigerated containers described above may provide output listed below, including sensor data. As containers may have different thermal behavior, separate data for each container may be acquired for training a system to identify container conditions as described above. A controller may also maintain a unique ID of a container (as is typical for intermodal containers), so that each container can be monitored and tracked individually. A typical list of data provided by a refrigeration controller is as follows:

1. ID number of the container: The ID of each container (e.g., reefer or "asset") is a unique number, allowing tracking of behavior monitored.
2. Temperature Set Point: target temperature in the container
3. Supply Temperature: Temperature of air leaving refrigeration system
4. Secondary Supply Probe Temperature: backup measurement of supply temperature
5. Return Temperature: temperature of air in container drawn into refrigeration vent
6. Secondary Return Probe Temperature: backup measurement
7. Humidity: current humidity in container
8. Humidity Set Point
9. Ambient Temp: Temperature outside the container
10. Vent cubic meters/hour (CMH): Measure of how far open the container vent is, indicating how much fresh air is getting into the container per hour.
11. In-Range Status: Indicates if the cargo is in a target range temperature
12. PTI Status: "Pre Treatment Inspection." indicates if inspection performed
13. Defrost Status: If the refrigerator machine is in status defrost then the device ignores the data and not use it for any calculations.
14. Vent percent: The percentage of the vent open influences the humidity
15. In-Range Status: Indicates if the cargo is in a target range temperature
16. PTI Status: "Pre Treatment Inspection." indicates if inspection performed
17. Defrost Status: If the refrigerator machine is in status defrost then the device ignores the data and not use it for any calculations.
18. Economy Mode
19. System mode
20. Control mode
21. Bulb Mode
22. Suction Pressure: pressure before compressor
23. Suction Temperature: temperature before compressor
24. Discharge Pressure: pressure after compressor
25. Discharge Temperature: temperature after compressor
26. Condenser Pressure: pressure after condenser
27. Compressor Meter: Indicates hours of compressor operation
28. Last Successful PTI: time of PTI
29. USDA 1
30. USDA 2
31. USDA 3
32. Cargo Temp
33. O2
34. CO2
35. Temperature Target Range: pre-set
36. Evaporator1 Coil Temperature
37. Condenser Coil Temperature
38. Compressor Coil Temperature
39. Compressor2 Coil Temperature
40. Ambient Air Temperature ° C.
41. Cargo 1 Temperature
42. Cargo 2 Temperature
43. Cargo 3 Temperature
44. Cargo 4 Temperature
45. Relative Humidity
46. AVL Fp1 CMH
47. Suction pressure Bar Relative
48. Discharge pressure Bar Relative
49. Line Voltage Volt
50. Line Frequency Fp1 Hz
51. Current Consumption Amp
52. Current Consumption Amp
53. Current Consumption Amp
54. Co2 reading %
55. O2 reading %
56. Alarm present: no analysis if present
57. Capacity Load Fp1
58. DI-LPCO
59. DI-HPCO
60. DO-Economizer Valve
61. DO-Digital Valve
62. Power DO-Heater:
63. Power DO-Compressor
64. Power DO-Evaporator High
65. Power DO-Evaporator Low
66. Power DO-Condenser Fan
67. Container ID: Container ID in characters
68. Set Point 1
69. Set Point 2

70. Current operation mode: may be same as PTI
71. O2 Set Point
72. CO2 Set Point
73. CA Mode
74. USDA 1
75. USDA 2
76. USDA 3
77. USDA 4/Cargo
78. High Refrigerant pressure:
79. Low Refrigerant pressure:
80. Operation Mode
81. Controller HW version
82. Controller SW version
83. Controller ID
84. Quest Mode
85. Improper compressor operation: If improper, no analysis
86. Return/Supply
87. Alarms sensors: If there are alarms, no analysis
88. Discharge Gas sensor
89. Ambient sensor
90. Evaporator output sensor
91. Humidity sensor
92. High pressure transducer
93. Low pressure transducer
94. Voltage
95. Total current: If out of range, indicates problem
96. Compressor current
97. Time and Date
98. GPS Date & Time: Time stamp of location and time applied to all data
99. Ambient temperature: This is another reference if the ambient sensor of the asset is not function
100. Power status—ON/OFF
101. Accelerometer
102. Battery Voltage

The invention claimed is:

1. A method of monitoring a refrigerated cargo container in real time, implemented by a controller having one or more processors and having memory storage, the memory storage including instructions that when executed by the one or more processors implement steps comprising:
receiving sensor signals from a plurality of sensors that include two or more of a container air temperature sensor, a container air humidity sensor, a refrigeration unit suction pressure sensor, and a refrigeration unit discharge pressure sensor;
processing the sensor signals to identify one or more signal characteristics that correspond to predefined patterns, wherein the predefined patterns are correlated to one or more container conditions including at least one of an open door, a container load level, and a cargo type;
providing a status notification indicative of the one or more container conditions; and
determining the predefined patterns by receiving training sensor signals, from multiple refrigeration controllers on multiple respective refrigerated containers, during training mode operation, when the one or more container conditions of open door, cargo load level and cargo type are known, identifying patterns in the training sensor signals, and correlating the identified patterns with the one or more of the known container conditions of open door, cargo load level, and cargo type.

2. The method of claim 1, wherein the status notification is provided at regular time intervals.

3. The method of claim 1, wherein the status notification is an alert provided when one of the container conditions is not within a predefined proper range.

4. The method of claim 1, wherein the sensor signals from the container air temperature sensor indicate a refrigeration return air temperature, and wherein the predefined patterns include patterns of a return air temperature signal that are correlated to the one or more container conditions.

5. A method of monitoring a refrigerated cargo container in real time, implemented by a controller having one or more processors and having memory storage, the memory storage including instructions that when executed by the one or more processors implement steps comprising:
receiving sensor signals from a plurality of sensors that include a container air temperature sensor, and one or more of a container air humidity sensor, a refrigeration unit suction pressure sensor, and a refrigeration unit discharge pressure sensor, wherein the sensor signals from the container air temperature sensor indicate a refrigeration supply air temperature;
processing the sensor signals to identify one or more signal characteristics that correspond to predefined patterns, wherein the predefined patterns are correlated to one or more container conditions including at least one of an open door, a container load level, and a cargo type, and wherein the predefined patterns include patterns of a supply air temperature signal that are correlated to the one or more container conditions; and,
providing a status notification indicative of the one or more container conditions.

6. A method of monitoring a refrigerated cargo container in real time, implemented by a controller having one or more processors and having memory storage, the memory storage including instructions that when executed by the one or more processors implement steps comprising:
receiving sensor signals from a plurality of sensors that include an ambient temperature sensor providing sensor signals of ambient temperature outside of the refrigerated cargo container, and further include two or more of a container air temperature sensor, a container air humidity sensor, a refrigeration unit suction pressure sensor, and a refrigeration unit discharge pressure sensor;
processing the sensor signals to identify one or more signal characteristics that correspond to predefined patterns, wherein the predefined patterns are correlated to one or more container conditions including at least one of an open door, a load level, and a cargo type, and wherein the predefined patterns include patterns of an ambient temperature signal that are correlated to the one or more container conditions; and,
providing a status notification indicative of the one or more container conditions.

7. The method of claim 1, wherein receiving the sensor signals from the plurality of sensors comprises receiving the sensor signals by an auxiliary processor of the refrigerated cargo container, from a refrigeration controller of the refrigerated cargo container.

8. The method of claim 1, wherein the correlation of the predefined patterns to the container load level is a correlation to a binary alternative of a container empty or a container full.

9. The method of claim 1, wherein the correlation of the predefined patterns to the container load level condition is a correlation to a percent of utilized container capacity.

10. A system of monitoring a refrigerated cargo container in real time comprising:

a plurality of sensors, comprising two or more of a container air temperature sensor, a container air humidity sensor, a refrigeration unit suction pressure sensor, and a refrigeration unit discharge pressure sensor; and a controller comprising one or more processors and comprising memory storage, the memory storage including instructions that when executed by the one or more processors implement steps of:

receiving sensor signals from the plurality of sensors;

processing the sensor signals to identify one or more container conditions, including at least one of an open door, a container load level, and a cargo type, wherein processing the sensor signals comprises identifying signal characteristics that correspond to predefined patterns, and wherein the predefined patterns are correlated to at least one of the one or more container conditions; and providing a status notification indicative of the one or more container conditions; and determining the predefined patterns by receiving training sensor signals, from multiple refrigeration controllers on multiple respective refrigerated containers, during training mode operation, when the one or more container conditions of open door, cargo load level and cargo type are known, identifying patterns in the training sensor signals, and correlating the identified patterns with the one or more of the known container conditions of open door, cargo load level, and cargo type.

11. The system of claim 10, wherein the status notification is an alert provided when one of the container conditions is not within a predefined proper range.

12. The system of claim 10, wherein the sensor signals from the container air temperature sensor indicate a refrigeration return air temperature, and wherein the predefined patterns include patterns of a return air temperature signal that are correlated to the one or more container conditions.

13. A system of monitoring a refrigerated cargo container in real time comprising:

a plurality of sensors, comprising two or more of a container air temperature sensor, a container air humidity sensor, a refrigeration unit suction pressure sensor, and a refrigeration unit discharge pressure sensor; and a controller comprising one or more processors and comprising memory storage, the memory storage including instructions that when executed by the one or more processors implement steps of:

receiving sensor signals from the plurality of sensors, wherein the sensor signals include signals indicating a refrigeration supply air temperature;

processing the sensor signals to identify one or more container conditions, including at least one of an open door, a container load level, and a cargo type, wherein processing the sensor signals comprises identifying signal characteristics that correspond to predefined patterns, wherein the predefined patterns are correlated to at least one of the one or more container conditions, and wherein the predefined patterns include patterns of a supply air temperature signal that are correlated to the one or more container conditions; and providing a status notification indicative of the one or more container conditions.

14. The system of claim 10, A system of monitoring a refrigerated cargo container in real time comprising:

a plurality of sensors, comprising two or more of a container air temperature sensor, a container air humidity sensor, a refrigeration unit suction pressure sensor, and a refrigeration unit discharge pressure sensor, and further comprising an ambient temperature sensor providing sensor signals of ambient temperature outside of the refrigerated cargo container; and a controller comprising one or more processors and comprising memory storage, the memory storage including instructions that when executed by the one or more processors implement steps of:

receiving sensor signals from the plurality of sensors;

processing the sensor signals to identify one or more container conditions, including at least one of an open door, a container load level, and a cargo type, wherein processing the sensor signals comprises identifying signal characteristics that correspond to predefined patterns, wherein the predefined patterns are correlated to at least one of the one or more container conditions, and wherein the predefined patterns include patterns of an ambient temperature signal that are correlated to the one or more container conditions; and providing a status notification indicative of the one or more container conditions.

\* \* \* \* \*